US008813475B2

(12) United States Patent
Cho et al.

(10) Patent No.: US 8,813,475 B2
(45) Date of Patent: Aug. 26, 2014

(54) METHOD FOR PREVENTING CHOKING OF UREA INJECTION NOZZLE ON SCR SYSTEM

(75) Inventors: Byoung Yong Cho, Seoul (KR); Jaeseok Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 454 days.

(21) Appl. No.: 13/315,209

(22) Filed: Dec. 8, 2011

(65) Prior Publication Data

US 2013/0047585 A1 Feb. 28, 2013

(30) Foreign Application Priority Data

Aug. 30, 2011 (KR) ........................ 10-2011-0087315

(51) Int. Cl.
*F01N 3/00* (2006.01)
*F01N 3/20* (2006.01)
(52) U.S. Cl.
CPC ........... *F01N 3/2066* (2013.01); *F01N 2610/02* (2013.01); *F01N 2610/1493* (2013.01); *Y02T 10/24* (2013.01)
USPC .............................................. 60/274; 60/277
(58) Field of Classification Search
CPC .......... F01N 3/2066; F01N 2610/1493; F01N 2610/02; Y02T 10/24
USPC .................................................... 60/274, 277
See application file for complete search history.

(56) References Cited

U.S. PATENT DOCUMENTS

| 2007/0240405 | A1* | 10/2007 | Nishina et al. | 60/286 |
| 2010/0005871 | A1* | 1/2010 | Kitazawa | 73/114.69 |
| 2010/0071349 | A1* | 3/2010 | Kitazawa | 60/277 |
| 2010/0139254 | A1* | 6/2010 | Sebestyen et al. | 60/286 |
| 2011/0107742 | A1* | 5/2011 | Igarashi et al. | 60/277 |

* cited by examiner

*Primary Examiner* — Thomas Denion
*Assistant Examiner* — Jason Shanske
(74) *Attorney, Agent, or Firm* — Morgan, Lewis & Bockius LLP

(57) ABSTRACT

A method for preventing choking of a urea injection nozzle in after run operation on a SCR system which supplies urea stored in a urea tank through a supply module, a urea injection nozzle and a urea line connecting the supply module and the urea injection nozzle, the method for preventing choking of a urea injection nozzle includes comparing pressure within the supply module with a first predetermined pressure (Pa), open controlling the urea injection nozzle when the pressure in the supply module is higher than the first predetermined pressure (Pa) or repeating open/close controlling the urea injection nozzle when the pressure in the supply module is lower than the first predetermined pressure (Pa), pressure equilibrium which recovers pressure in the supply module and stopping the after run operation when the balancing pressure is completed.

8 Claims, 7 Drawing Sheets

METHOD FOR PREVENTING CHOKING OF UREA INJECTION NOZZLE ON SCR SYSTEM

CROSS-REFERENCE TO RELATED APPLICATION

This application claims priority to and the benefit of Korean Patent Application No. 10-2011-0087315 filed Aug. 30, 2011, the entire contents of which application is incorporated herein for all purposes by this reference.

BACKGROUND OF INVENTION

1. Field of Invention

The present invention relates to a method for preventing choking of a urea injection nozzle on a SCR system. More particularly, the present invention relates to a method for preventing choking of a urea injection nozzle on a SCR system which determines whether a urea injection nozzle is choked and prevents choking of the urea injection nozzle in after run operation.

2. Description of Related Art

Generally, exhaust gas exhausted from an exhaust manifold of an engine is guided to a catalytic converter disposed and purified, and then passes though a muffler to reduce noise, and then finally is exhausted through an exhaust pipe to atmosphere.

The catalytic converter treats pollutant such as NOx within the exhaust gas.

A Selective Catalytic Reduction (SCR) apparatus, one of the catalytic converter, purifies NOx within the exhaust gas, and urea, ammonia, carbon monoxide and hydrocarbon (HC) and so on are used as reductant.

When the reductant is supplied to the exhaust gas, nitrogen oxide within the exhaust gas is deoxidized to nitrogen by oxidation-reduction reaction with the reductant.

FIG. 5 is a drawing showing a conventional SCR system.

As shown in FIG. 5, a conventional SCR system includes a urea tank 60 in which urea 62 is stored, a supply module 50 supplying the urea 62 within the urea tank 60, and a urea injection nozzle 20 supplying the supplied urea from the supply module 50 to a selective catalytic reduction catalyst 12.

The urea 62 passes through a filter 52 and supplied an exhaust pipe 10 in front of the SCR catalyst 12.

A dosing control unit (DCU) 25 controls supplied amount of the urea 62.

A temperature sensor 15 may detect temperature of the urea 62 or detect temperature of exhaust gas passed through the SCR catalyst 12.

In a general SCR system, urea is frozen into ice at −11° C. and corrosiveness of the urea is increased at 70° C., and thus when a vehicle or a system stops, the urea is withdrawn to the urea tank, and it is called as "after run".

While the SCR apparatus is operated, the urea is supplied from the urea tank 60 and the supply module 50 to the urea injection nozzle 20, however in an after run operation, the urea is withdrawn in reverse order.

If the urea injection nozzle where the urea contacts is applied heat by exhaust gas temperature or coolant, the temperature of the urea reaches to temperature (71-75° C.) of crystallization and the after run is operated with 100% open of the urea injection nozzle, crystallization of the urea is generated in the urea injection nozzle and thus the urea injection nozzle may be choked.

That is, while the after run is operated, urea the injection nozzle 20 has to be opened, and crystallization of the urea is generated in the urea injection nozzle, however choking of the urea injection nozzle 20 may not be detected.

Particularly, if flowing backward of the urea occurs in winter season, the system may be damaged.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for preventing choking of a urea injection nozzle on a SCR system which may repeat opening and closing of the urea injection nozzle in order to prevent choking of the urea injection nozzle.

A method for preventing choking of a urea injection nozzle in after run operation on a SCR system which supplies urea stored in a urea tank through a supply module, a urea injection nozzle and a urea line connecting the supply module and the urea injection nozzle, the method for preventing choking of a urea injection nozzle of various embodiments of the present invention may include comparing pressure within the supply module with a first predetermined pressure (Pa), open controlling the urea injection nozzle when the pressure in the supply module is higher than the first predetermined pressure (Pa) or repeating open/close controlling the urea injection nozzle when the pressure in the supply module is lower than the first predetermined pressure (Pa), pressure equilibrium which recovers pressure in the supply module and stopping the after run operation when the balancing pressure is completed.

The pressure equilibrium may include comparing rate of increase in pressure within the supply module with a first rate of increase in pressure (Pc), open controlling the urea injection nozzle when the rate of increase in pressure within the supply module is higher than the first rate of increase in pressure (Pc) and repeating open/close controlling the urea injection nozzle when the rate of increase in pressure within the supply module is lower than the first rate of increase in pressure (Pc).

The method may further include comparing pressure within the supply module with a second predetermined pressure (Pb) after elapse of a first predetermined time (ta) and stopping the pressure equilibrium when the pressure within the supply module is higher than the second predetermined pressure (Pb).

The method may further include determining if a second predetermined time (tb) is elapsed when the pressure within the supply module is lower than the second predetermined pressure (Pb) and stopping the pressure equilibrium when the second predetermined time (tb) is elapsed.

The method may further include comparing rate of increase in pressure within the supply module with a second rate of increase in pressure (Pd) when the second predetermined time (tb) is elapsed and repeating open/close controlling the urea injection nozzle when the rate of increase in pressure within the supply module is higher than the second rate of increase in pressure (Pd).

The method may further include comparing atmosphere temperature with a predetermined temperature (Tp) when the rate of increase in pressure within the supply module is lower than the second rate of increase in pressure (Pd) and stopping the pressure equilibrium when the atmosphere temperature is higher than the predetermined temperature (Tp).

The method may further include stopping the after run when the atmosphere temperature is lower than the predetermined temperature (Tp).

The method may further include turning on a warning lamp before the stopping the after run.

A method for preventing choking of a urea injection nozzle on a SCR system according to various embodiments of the present invention may determine whether a urea injection nozzle is choked and prevent choking of the urea injection nozzle in after run operation and flowing backward of the urea.

Because remained urea in a urea line does not exist, and thus extra device for defrosting the urea in winter season is not required.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
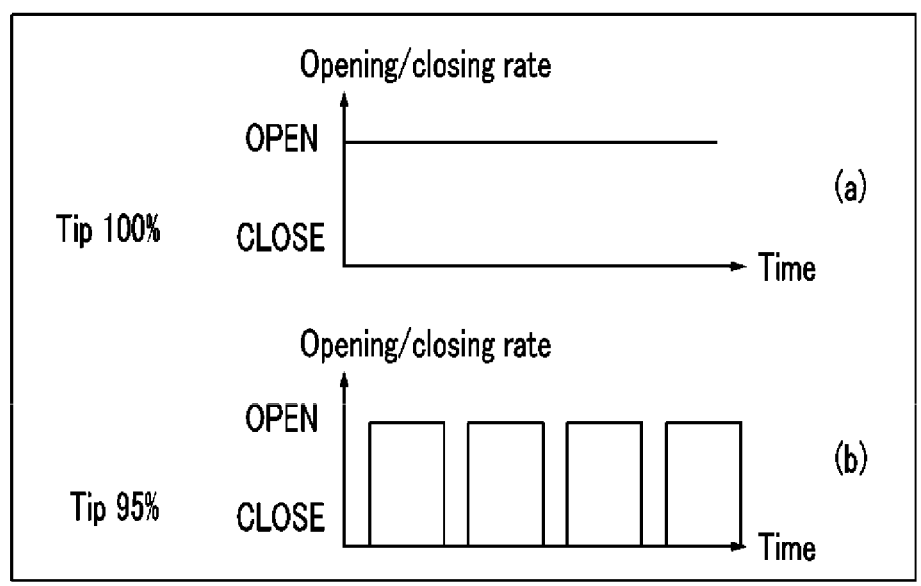
FIG. 1 is a graph showing opening/closing operation of an exemplary urea injection nozzle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

For easy comprehension, constituent elements which are described in description of the related art will be described using the same reference numeral.

Figure 6:
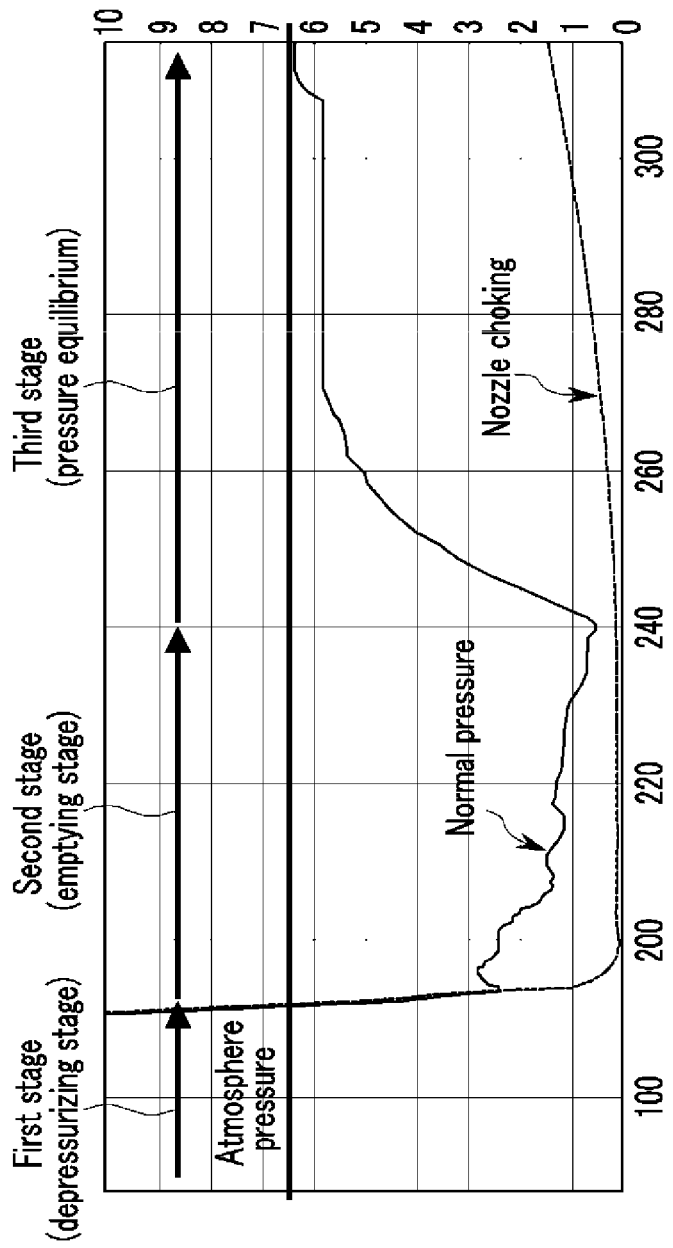
FIG. 6 is a graph showing pressure change in a supply module in after run operation.

FIG. 6 is a graph showing pressure change in a supply module in after run operation.

Figure 5:
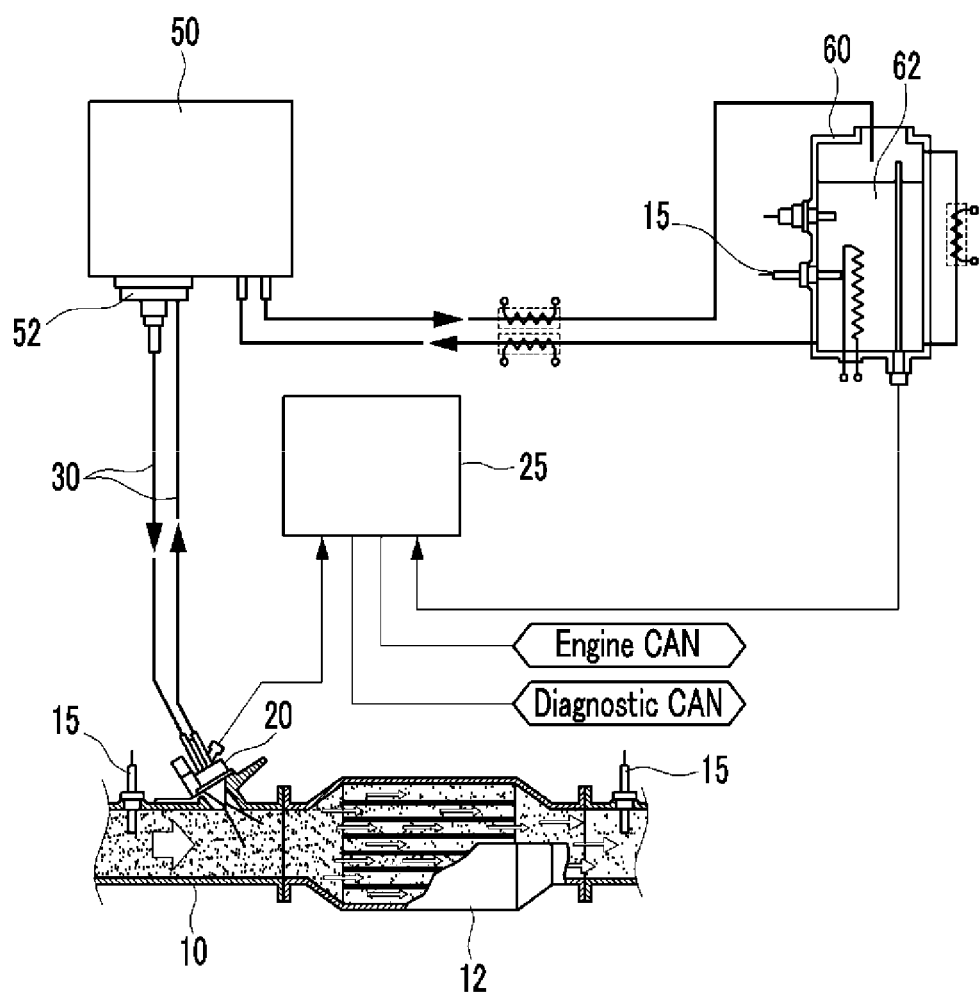
FIG. 5 is a drawing showing a conventional SCR system.

Referring to FIG. 5 and FIG. 6, after run operation includes depressurizing stage of which pressure within a supply module 50 is depressurized, emptying stage (or vacuum stage) of which urea is withdrawn into a tank 60 and negative pressure is created in the supply module 50, and pressure equilibrium (pressure equilibrium stage) of which the created negative pressure in the emptying stage is released.

Figure 4:
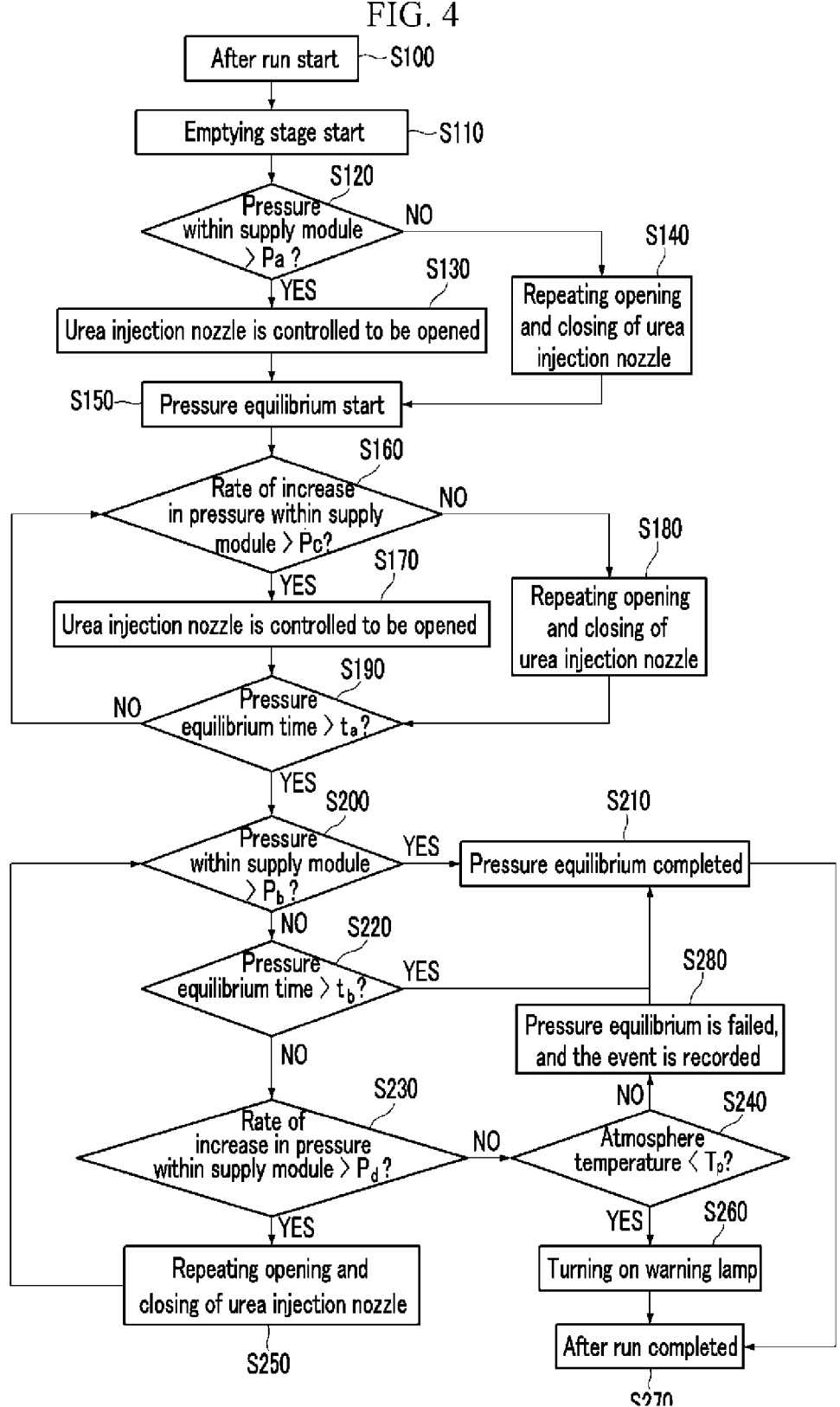
FIG. 4 is a flow chart showing a method for preventing choking of various embodiments urea injection nozzle according to the present invention.

FIG. 4 is a flow chart showing a method for preventing choking of a urea injection nozzle according to various embodiments of the present invention.

Referring to FIG. 4, whether the after run is operated and current stage is the emptying stage are checked S100 and S110.

In the depressurizing stage, negative pressure is not created and thus choking of a urea injection nozzle 20 may not be occurred.

When the current stage is the emptying stage, pressure within the supply module 50 is compared with a first predetermined pressure (Pa) S120.

When the pressure within the supply module 50 is higher than the first predetermined pressure (Pa), it is determined that the system is normal and thus a urea injection nozzle 20 is controlled to be opened S130.

However, the pressure within the supply module 50 is lower than the first predetermined pressure (Pa), it is determined that the urea injection nozzle 20 is choked, and thus the urea injection nozzle 20 is opened and closed repeatedly S140.

By repeating open/close controlling the urea injection nozzle 20, choking of the urea injection nozzle 20 may be prevented, wherein the first predetermined pressure (Pa), for example may be about −120 mmbar.

After the emptying stage is completed, the pressure equilibrium starts S150.

In the emptying stage, negative pressure is created in a urea line 30 (in the supply module 50), and in the pressure equilibrium stage, the pressure within the supply module 50 is recovered to reach atmospheric pressure degree.

In the pressure equilibrium stage, the urea injection nozzle 20 may also be choked and thus choking or not is checked.

In this case, rate of increase in pressure within the supply module 50 is compared with a first rate of increase in pressure Pc S160, and it is determined that the urea injection nozzle 20 is not choked when the rate of increase in pressure within the supply module 50 is higher than the first rate of increase in pressure Pc. And thus the urea injection nozzle 20 is controlled to be opened S170.

However if the rate of increase in pressure within the supply module 50 is lower than the first rate of increase in pressure Pc, it is determined that the urea injection nozzle 20 is choked. And thus the urea injection nozzle 20 is controlled to be opened and closed repeatedly S180.

Because, in FIG. 6, if current state is normal, pressure within the supply module 50 has to be increased to about the atmospheric pressure. If the pressure within the supply module 50 is not increased, it may be determined that the urea injection nozzle 20 is choked. In this case, the first rate of increase in pressure Pc may be, for example, 5 mmbar/sec.

After the step S170, S180, completion of pressure equilibrium stage is determined by comparing pressure equilibrium time with a first predetermined time ta S190.

In the step S190, if the pressure equilibrium time is less than the first predetermined time ta, the pressure equilibrium continues.

If the pressure equilibrium time is larger than the first predetermined time ta, the pressure equilibrium stage is completed. However before completion of the pressure equilibrium stage, whether the urea injection nozzle 20 is choked or not is checked again.

That is, the pressure within the supply module 50 is compared with a second predetermined pressure Pb S200, and it is determined that the pressure equilibrium stage is normally implemented when the pressure within the supply module 50 is higher than the second predetermined pressure Pb. And thus, the pressure equilibrium stage is completed S210.

In this case, the second predetermined pressure Pb may be, for example about −100 mmbar higher than the first predetermined pressure Pa.

If the pressure within the supply module 50 is similar to the second predetermined pressure Pb, it may be determined that the after run operation is implemented normally in the pressure equilibrium stage without choking of the urea injection nozzle 20, and thus the after run operation is completed S270.

When the pressure within the supply module 50 is lower than the second predetermined pressure Pb, additional pressure equilibrium is implemented. For this, additional pressure equilibrium time is compared with a second predetermined time tb S220, and If the additional pressure equilibrium time is larger than the second predetermined time tb, the pressure equilibrium stage is completed S210.

If the pressure equilibrium time is less than the second predetermined time tb, rate of increase in pressure within the supply module 50 is compared with a second rate of increase in pressure Pd S230, the urea injection nozzle 20 is controlled to be opened and closed repeatedly S250 in order not to choke the urea injection nozzle 20 when the rate of increase in pressure within the supply module 50 is higher than the second rate of increase in pressure Pd.

And then it returns to S200.

In this case, the second rate of increase in pressure Pd may be, for example about 2.5 mmbar/sec lower than the first rate of increase in pressure Pc.

However, if the rate of increase in pressure within the supply module 50 is lower than the second rate of increase in pressure Pd at S230, atmosphere temperature is compared with a predetermined temperature S240.

The predetermined temperature Tp may be denoted as temperature that the urea is frozen into ice.

When the atmosphere temperature is lower than the predetermined temperature Tp, the after run operation is completed S270.

In this case, the urea may be frozen into ice, and thus a warning lamp may be turned on for warning a driver S260.

However, if the atmosphere temperature is higher than the predetermined temperature Tp at S240, it is determined that the pressure equilibrium is failed. And thus the event is recorded S280 and then and then the after run operation is completed S270.

Hereinafter, detailed method for preventing choking of the urea injection nozzle 20 according to various embodiments of the present invention will be described.

FIG. 1 is a graph showing opening/closing operation of a urea injection nozzle according to various embodiments of the present invention.

Referring to FIG. 1, if it is determined that the urea injection nozzle 20 is choked, the urea injection nozzle 20 is controlled to be opened and closed at 95% of opening/closing rate.

That is, opening and closing durations of the urea injection nozzle 20 are implemented at ratio of 95:5.

With this control method, the urea injection nozzle 20 may not be choked.

Figure 2:
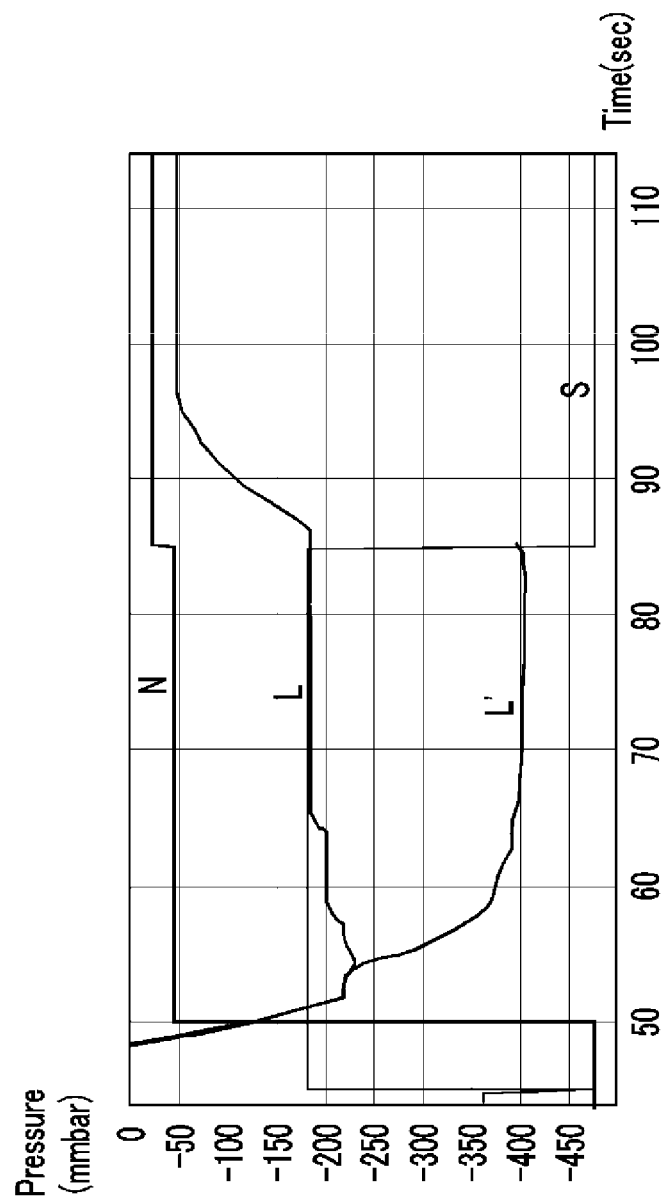
FIG. 2 and FIG. 3 are graphs showing pressure change within an exemplary urea line at emptying stage and pressure equilibrium stage according to the present invention.
Figure 3:
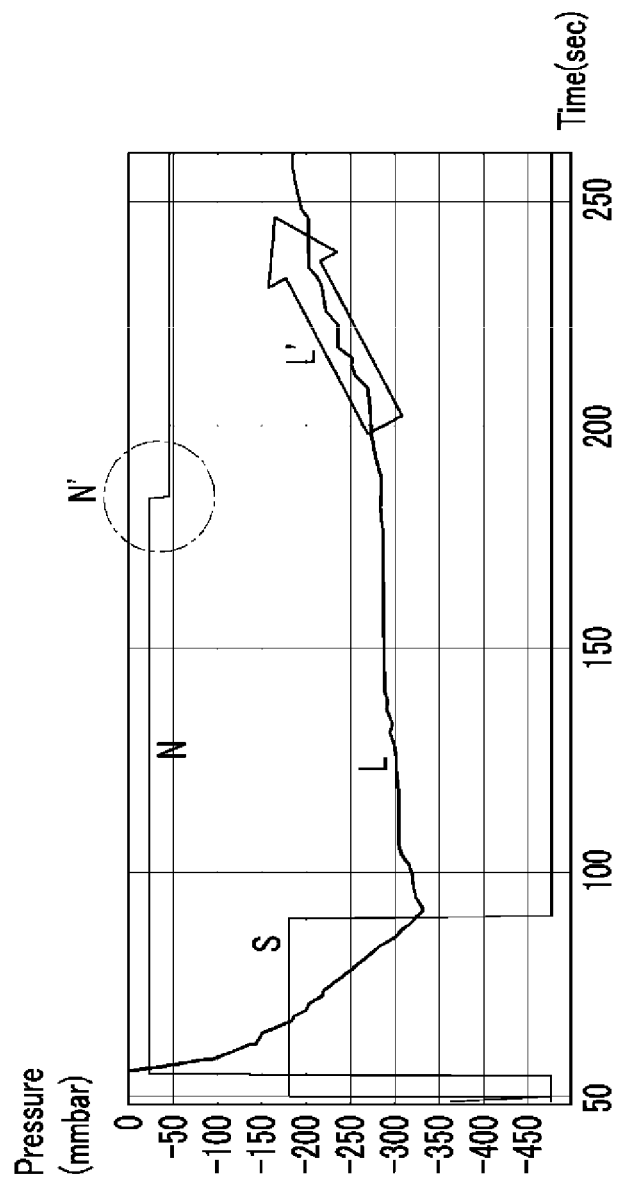

FIG. 2 and FIG. 3 are graphs showing pressure change within a urea line at emptying stage and pressure equilibrium stage according to various embodiments of the present invention.

Figure 7:
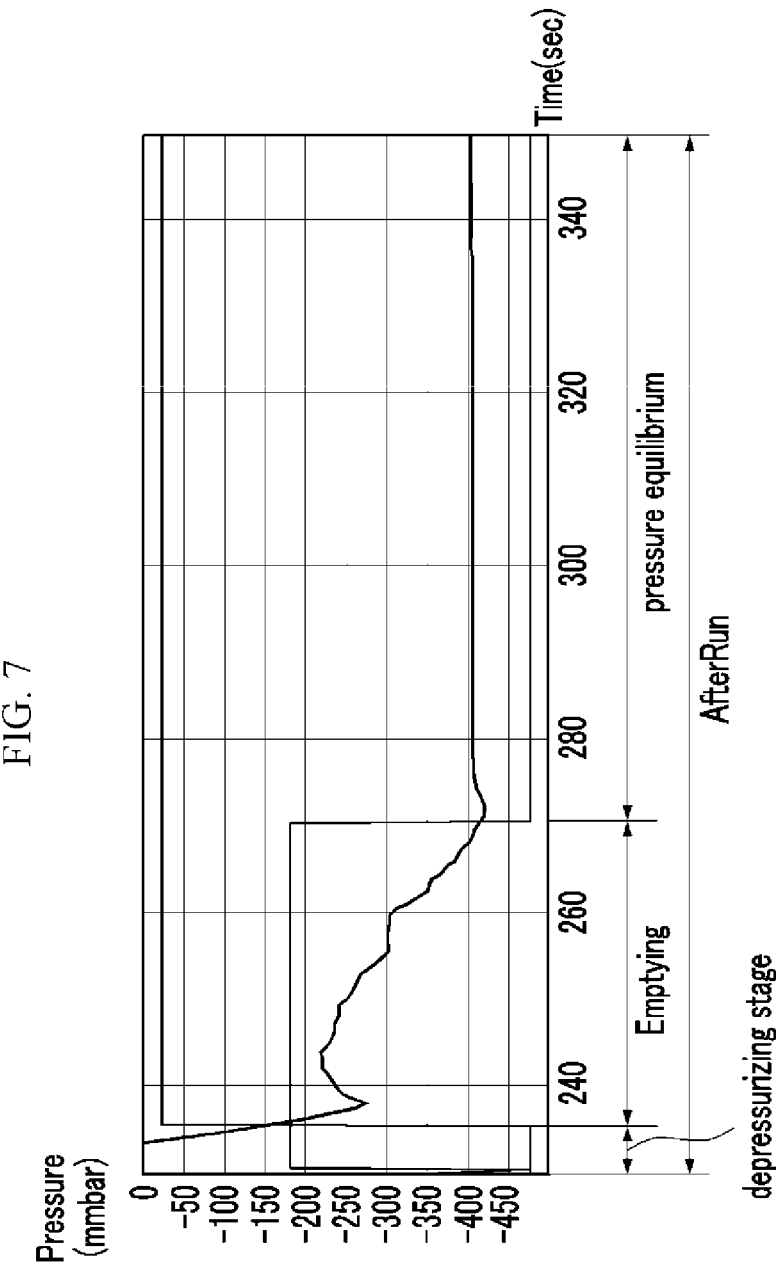
FIG. 7 is a graph showing pressure change in a supply module in after run operation when a urea injection nozzle is choked.

FIG. 7 is a graph showing pressure change in a supply module in after run operation when a urea injection nozzle is choked.

In the FIG. 2, FIG. 3 and FIG. 7, "N" denotes opening/closing rate of the urea nozzle, "L" denotes pressure change within the supply pressure module 50, and "S" denotes rotation speed of a supply module motor.

In the FIG. 7, if the urea injection nozzle 20 is choked during the after run operation, pressure in the urea line 30, that is, the pressure within the supply module 50 is lower below about −400 mmbar, so excessive negative pressure is created.

For preventing that, as shown in FIG. 2, when the pressure in the urea line 30 (the pressure within the supply module 50) reaches to about −200 mmbar in the emptying stage, the urea injection nozzle 20 is controlled to be opened and closed at 95% of opening/closing rate in order not to lower the pressure in the urea line 30 excessively.

That is, the pressure change in the urea line 30 follows a line denoted as L not a line denoted as L'. And thus, the pressure reaches to about the atmospheric pressure in the pressure equilibrium stage and pressure equilibrium is completed also flowing backward may not occur.

Also, if excessive negative pressure is created in the pressure equilibrium stage, the urea injection nozzle 20 is controlled to be opened and closed at 95% of opening/closing rate for rising the pressure within the urea line 30 (the supply module 50) as shown in FIG. 3. And thus, the pressure change in the urea line 30 follows a line denoted as L and then a line denoted as L' so that negative pressure within the urea line 30 may be increased.

In this case, opening and closing control of the urea injection nozzle 20 may start at N', so that flowing backward may not occur.

For convenience in explanation and accurate definition in the appended claims, the terms front and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preventing choking of a urea injection nozzle in an after-run operation on an Selective Catalytic Reduction (SCR) system which supplies urea stored in a urea tank through a supply module, a urea injection nozzle and a urea line connecting the supply module and the urea injection nozzle, the method for preventing choking of a urea injection nozzle comprising:

comparing a supply pressure within the supply module with a first predetermined pressure (Pa);

open controlling the urea injection nozzle when the supply pressure in the supply module is higher than the first predetermined pressure (Pa) or repeating open/close controlling the urea injection nozzle when the supply pressure in the supply module is lower than the first predetermined pressure (Pa);

applying pressure equilibrium which recovers pressure in the supply module; and stopping the after-run operation when the applying pressure equilibrium is completed.

2. The method for preventing choking of a urea injection nozzle of claim 1, wherein the pressure equilibrium comprises:
- comparing rate of increase in the supply pressure within the supply module with a first rate of increase in pressure (Pc);
- open controlling the urea injection nozzle when the rate of increase in the supply pressure within the supply module is higher than the first rate of increase in pressure (Pc); and
- repeating open/close controlling the urea injection nozzle when the rate of increase in the supply pressure within the supply module is lower than the first rate of increase in pressure (Pc).

3. The method for preventing choking of a urea injection nozzle of claim 2, wherein the method further comprises:
- comparing the supply pressure within the supply module with a second predetermined pressure (Pb) after elapse of a first predetermined time (ta); and
- stopping the pressure equilibrium when the supply pressure within the supply module is higher than the second predetermined pressure (Pb).

4. The method for preventing choking of a urea injection nozzle of claim 3, wherein the method further comprises:
- determining if a second predetermined time (tb) is elapsed when the supply pressure within the supply module is lower than the second predetermined pressure (Pb); and
- stopping the pressure equilibrium when the second predetermined time (tb) is elapsed.

5. The method for preventing choking of a urea injection nozzle of claim 4, wherein the method further comprises:
- comparing rate of increase in the supply pressure within the supply module with a second rate of increase in pressure (Pd) when the second predetermined time (tb) is elapsed; and
- repeating open/close controlling the urea injection nozzle when the rate of increase in the supply pressure within the supply module is higher than the second rate of increase in pressure (Pd).

6. The method for preventing choking of a urea injection nozzle of claim 5, wherein the method further comprises:
- comparing atmosphere temperature with a predetermined temperature (Tp) when the rate of increase in the supply pressure within the supply module is lower than the second rate of increase in pressure (Pd); and
- stopping the pressure equilibrium when the atmosphere temperature is higher than the predetermined temperature (Tp).

7. The method for preventing choking of a urea injection nozzle of claim 5, wherein the method further comprises:
- stopping the after-run operation when the atmosphere temperature is lower than the predetermined temperature (Tp).

8. The method for preventing choking of a urea injection nozzle of claim 7, wherein the method further comprises:
- turning on a warning lamp before the stopping the after-run operation.

* * * * *